(12) United States Patent
Rettig et al.

(10) Patent No.: US 8,120,351 B2
(45) Date of Patent: Feb. 21, 2012

(54) MAGNET SENSOR ARRANGEMENT FOR SENSING THE MOVEMENT OF ELEMENT MOVING IN LINEAR OR ROTARY FASHION

(75) Inventors: Rasmus Rettig, El Paso, TX (US); Christian Bauer, Schwieberdingen (DE); Birgit Vogelgesang, Ingersheim (DE)

(73) Assignee: Robert Bosch GmbH, Stuttgart (DE)

( * ) Notice: Subject to any disclaimer, the term of this patent is extended or adjusted under 35 U.S.C. 154(b) by 1258 days.

(21) Appl. No.: 10/588,678

(22) PCT Filed: Jan. 18, 2005

(86) PCT No.: PCT/EP2005/050185
§ 371 (c)(1),
(2), (4) Date: Aug. 8, 2006

(87) PCT Pub. No.: WO2005/088259
PCT Pub. Date: Sep. 22, 2005

(65) Prior Publication Data
US 2008/0116884 A1 May 22, 2008

(30) Foreign Application Priority Data

Mar. 11, 2004 (DE) .......................... 10 2004 011 810
Dec. 30, 2004 (DE) .......................... 10 2004 063 539

(51) Int. Cl.
*G01B 7/30* (2006.01)
(52) U.S. Cl. ......... 324/207.25; 324/207.21; 324/207.24; 324/174
(58) Field of Classification Search .................. 324/173, 324/174, 178, 179, 207.2, 207.21, 207.23, 324/207.24, 207.25, 207.26, 251, 252; 73/514.39
See application file for complete search history.

(56) References Cited

U.S. PATENT DOCUMENTS

| | | | | |
|---|---|---|---|---|
| 4,712,064 A * | 12/1987 | Eckardt et al. | ........... | 324/207.21 |
| 4,859,941 A * | 8/1989 | Higgs et al. | ................ | 324/207.2 |
| 5,210,489 A | 5/1993 | Peterson | | |
| 5,304,926 A * | 4/1994 | Wu | ............................ | 324/207.2 |
| 6,050,242 A * | 4/2000 | Wilkinson | ............... | 123/406.58 |
| 6,107,793 A * | 8/2000 | Yokotani et al. | ......... | 324/207.21 |
| 6,498,474 B1 * | 12/2002 | Turner | ......................... | 324/165 |
| 7,045,997 B2 * | 5/2006 | Yokotani et al. | ......... | 324/207.21 |

(Continued)

FOREIGN PATENT DOCUMENTS

DE 101 28 135 12/2002

(Continued)

*Primary Examiner* — Jay Patidar
(74) *Attorney, Agent, or Firm* — Michael J. Striker

(57) ABSTRACT

A magnetic sensor arrangement (1), having magnetically sensitive sensor elements (7, 8) whose electrical properties are changeable as a function of a magnetic field that a moving, passive transmitter element (11) is able to influence. The magnetic sensor arrangement (1) has two sensor elements (7, 8) in a gradiometer arrangement that are each respectively associated with one of two magnetic regions (4, 5) of a permanent magnet embodied in the form of a gap magnet (2; 20; 23), which regions are spaced apart from each other by a predetermined distance (sa). The regions (4, 5) and the gap magnet (2; 20; 23)—in terms of the for example wedge-shaped embodiment, the dimensions (h, b, t), the gap width (sa), the gap depth (st), and their positions in relation to the sensor elements (7, 8)—are situated so as to minimize the offset of the output signal of the sensor elements (7, 8) in the gradiometer arrangement.

6 Claims, 7 Drawing Sheets

U.S. PATENT DOCUMENTS

| | | | |
|---|---|---|---|
| 7,119,539 B2 * | 10/2006 | Butzmann | 324/252 |
| 2003/0107366 A1 * | 6/2003 | Busch et al. | 324/202 |
| 2003/0155909 A1 * | 8/2003 | Steinruecken et al. | 324/207.2 |
| 2003/0222642 A1 | 12/2003 | Butzmann | |

FOREIGN PATENT DOCUMENTS

| | | |
|---|---|---|
| EP | 0 419 040 | 3/1991 |
| WO | 03/019217 | 3/2003 |

* cited by examiner ated on Dec. 30, 2004. These German Patent Applications provides the basis for a claim of priority of invention under 35 U.S.C. 119(a)-(d).

MAGNET SENSOR ARRANGEMENT FOR SENSING THE MOVEMENT OF ELEMENT MOVING IN LINEAR OR ROTARY FASHION

CROSS-REFERENCE TO RELATED APPLICATIONS

The invention described and claimed hereinbelow is also described in German Patent Applications DE 10 2004 0118 10.8 filed on Mar. 11, 2004 and DE 10 2004 0635 39.0 filed on Dec. 30, 2004. These German Patent Applications provides the basis for a claim of priority of invention under 35 U.S.C. 119(a)-(d).

BACKGROUND OF THE INVENTION

The present invention relates to a magnetic sensor arrangement, in particular for sensing the movement of elements moved in linear or rotary fashion.

It is intrinsically known that magnetic field-sensitive sensors are used in many areas of use in which a contact-free detection of a movement is desired. This motion can be rotary or linear. It is necessary to draw a distinction here between two different basic measurement principles. On the one hand, attaching one or more active elements in the form of magnetic dipoles to the element to be detected makes it possible to determine the movement directly by means of the chronologically changing magnetic field at the sensor location. By contrast, with passive transmitter elements, which are comprised of a soft magnetic material, the magnetic field is generated by a working magnet that is affixed to the sensor. The sensor measures the change in the magnetic field of the working magnet induced by the movement of the transmitter elements.

In addition to the known Hall technology for magnetic field measurement, even with passive transmitter elements, the alternative use of so-called XMR technologies, i.e. magnetoresistive measurement principles, is on the rise in the automotive field. It should be noted that by contrast with Hall sensors, XMR sensors detect the so-called "in-plane" component of the magnetic field in the sensor element. Prior conventional XMR sensors use a working magnet for this purpose, whose field must be balanced so that the offset at the location of the sensitive element is zero or so else a so-called back-bias field is generated, which defines the operating point of the sensor.

For example, DE 101 28 135 A1 has described an approach in which a hard magnetic layer is deposited in close proximity to a magnetoresistive lamination stack, i.e. especially on top of and/or underneath it. This hard magnetic layer then primarily couples via its stray field into the magnetoresistive layers, thus generating a so-called bias magnetic field that functions as a magnetic field offset so that even with an only slight variation of an external magnetic field overlapping the internal magnetic field, it is possible to achieve an easily measurable, relatively large change in the actual measurement value, which is detected as a resistance change in the layer arrangement.

The above-described sensors are used in an intrinsically known fashion for detecting rotational speed, for example in the automotive field, often embodied in the form of a so-called gradiometer arrangement. This means that each pair of branches of a Wheatstone measuring bridge are spaced a predetermined distance apart so that a homogeneous magnetic field does not generate a bridge signal. A variation of the magnetic field in the region of the predetermined distance does, however, generate a bridge signal. As a result, the sensor measures only the signal of a magnetic claw-pole rotor whose pole pair distance corresponds approximately to the predetermined gradiometer distance.

In contrast with the absolutely measuring XMR elements, applying the gradiometer principle in a magnetoresistive XMR measuring bridge makes it possible to achieve a reduction in the sensitivity of the sensors to homogeneous interference fields. But it is no longer possible in this case to carry out a balancing of the previously used magnet so that the offset can be eliminated at both locations of the sensor elements of the gradiometer arrangement; an electronic balancing is in principle possible, but in this case, a large offset yields a relatively weak signal.

SUMMARY OF THE INVENTION

In a modification of a magnetic sensor arrangement of the type mentioned at the beginning, the magnetic sensor arrangement according to the present invention has two sensor elements in a gradiometer arrangement, each of which is associated with one of two magnetic regions spaced a predetermined distance apart from each other in a permanent gap magnet. In terms of their dimensions, the gap width, the gap shape, the gap depth, and their position in relation to the sensor elements, these regions and the entire permanent gap magnet are advantageously positioned so as to minimize the offset of the output signal of the sensor elements in the gradiometer arrangement.

The present invention consequently makes it possible to optimize the design of a magnetic circuit that generates a working field for a sensor, which operates using the gradiometer principle, i.e. through detection of the field gradients, thus enabling an offset-free operation of the sensor when variations in the magnetic field are generated by moving transmitter elements, in particular ferromagnetic gears. To that end, the magnetic circuit is composed of two regions whose fields overlap so that the so-called "in-plane" components of the resulting magnetic field and the working field in the sensitive x-direction in XMR sensors, are reduced at the gradiometer positions to such an extent that they vary around the zero position due to the influence of the passive transmitter elements. It is thus possible to detect very weak signals in an offset-free fashion.

This is particularly advantageous with very sensitive magnetoresistive XMR sensors, which should cover as large a working range as possible without an offset correction, i.e. from very high to very low field strengths. In comparison to magnetic circuits that are comprised of a plurality of separate components, the single-component gap magnet according to the present invention is simpler in design and less expensive to manufacture.

In a particularly advantageous fashion, the gap of the gap magnet has a wedge-shaped contour or one that is curved in some other way. This gap shape reduces the offset minimization in the magnetic circuit not only at the two gradiometer positions, but instead, spreads the reduction over a wide region parallel to the surface of the magnet or to a flux-conducting plate. This results in significantly reduced position change requirements in the gradiometer position of the XMR sensor element with regard to the magnetic arrangement.

But it is also possible for the gap of the permanent gap magnet to have a rectangular contour.

In an advantageous embodiment form, flux-conducting plates functioning as homogenization plates are positioned between the sensor elements and the magnetic regions. This homogenizes the field in the plane of the sensor elements and reduces the positioning precision of the sensor elements in relation to the magnetic pair required for offset-free operation.

According to another embodiment form, it is also advantageous if the magnetization of the regions is rotated by a predetermined angle α from its longitudinal direction oriented toward the sensor elements.

This premagnetization resulting from the inclined orientation of the field means that the sensor elements are situated in a magnetic field in which the sensitivity is at a maximum due to the presence of a so-called bias field. This also advantageously permits the above-mentioned homogenization plates to be provided.

The present invention can be used to particular advantage in a magnetic sensor arrangement for detecting the rotation angle of a wheel functioning as a transmitter element; the wheel, e.g. embodied in the form of a steel wheel, is provided with teeth along its circumference in order to influence the magnetic field in the vicinity of the magnetic sensor arrangement. Particularly when used in a motor vehicle, there are areas of use in which the magnetic field changes are induced by moving metallic elements, for example when the arrangement is used as a rotation speed sensor on the wheel or on the crankshaft, as a phase transmitter on the camshaft, as a rotation speed sensor in the transmission, or as some other form of linear distance sensor, angle sensor, or proximity sensor.

Exemplary embodiments of the present invention are explained in conjunction with the drawings.

DESCRIPTION OF THE PREFERRED EMBODIMENTS

Figure 1:
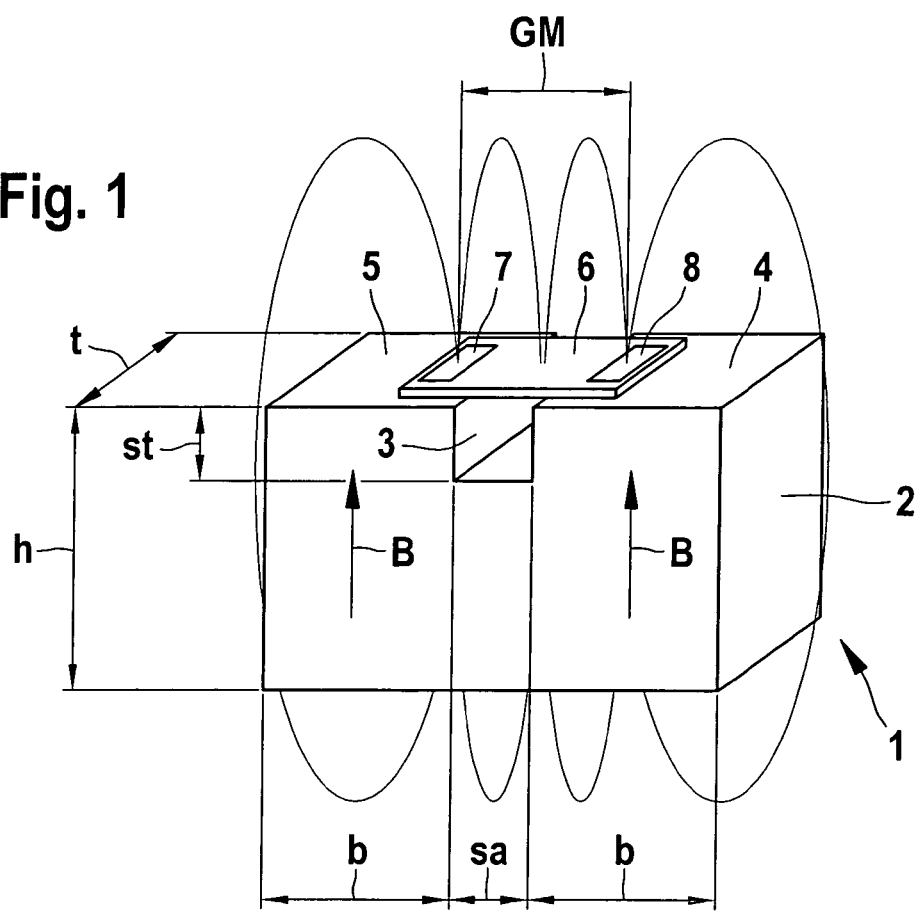
FIG. 1 is a schematic depiction of a magnetic sensor arrangement having two magnetic regions, which are part of a single-component permanent gap magnet and are each situated opposite from a magnetoresistive sensor element in a gradiometer arrangement.

FIG. 1 is a schematic depiction of a magnetic sensor arrangement 1, which has a permanent magnet embodied in the form of a gap magnet 2. On both sides of a gap 3, this gap magnet 2 has regions 4 and 5 that are magnetized in the same direction, whose respective magnetic field B is aligned with the field lines shown here extending in the direction of a sensor 6. The sensor 6 in this case is embodied in the form of an XMR sensor and has two magnetoresistive sensor elements 7 and 8. The sensor elements 7 and 8 are shown in a gradiometer arrangement—which has the gradiometer distance GM—and detect the changes in the respective field gradients that are caused, for example, by a metallic transmitter element, e.g. a gear depicted in FIG. 5, being moved past the magnetic sensor arrangement 1.

The optimal operating point of the sensor 6 is set via the distance of the individual magnets 4 and 5, defined by the gap width sa and the gap depth st in relation to each other, and can be adapted to the gradiometer distance GM of the sensor elements 7 and 8. The field line curves also depend on the dimensions h, b, and t of the gap magnet 2. For a fixed gradiometer distance GM, e.g. 2.5 mm, it is possible to establish the size, material, and arrangement of the gap magnet 2 so that the sensor 6 operates in an offset-free fashion and thus is able to detect the weakest possible signals in order to in turn permit the greatest possible distance from a transmitter element.

When no external transmitter element, e.g. a gear, is passing by, then the magnetic field lines of the magnetic sensor arrangement 1 extend so that at the location of the sensor elements 7 and 8, a small so-called "in-plane" component toward the outside is present. Through the use, for example, of a moving gear, a variation in the magnetic field occurs; the "in-plane" components are modulated around the zero position and thus generate an offset-free signal of the gradiometer arrangement.

Figure 2:
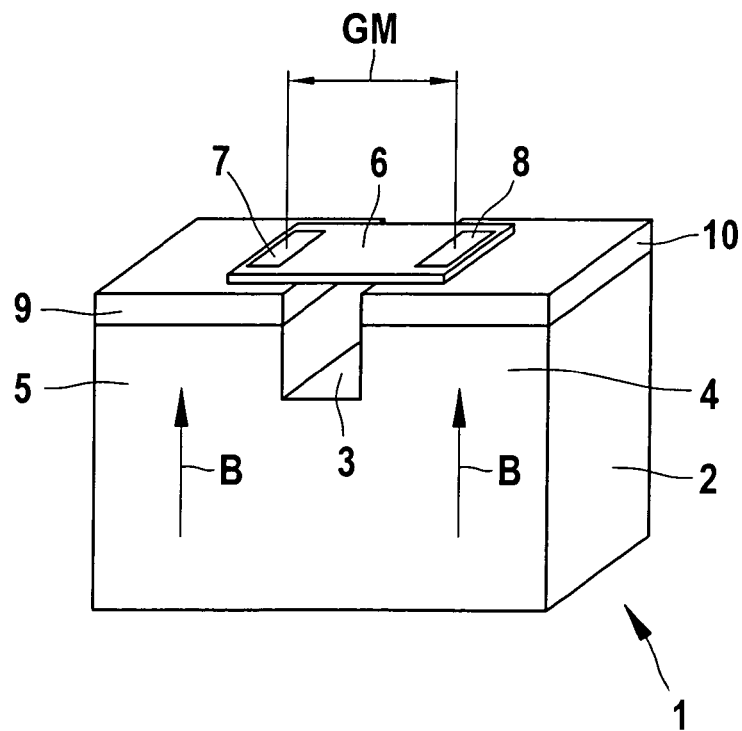
FIG. 2 shows an arrangement that has been expanded in relation to FIG. 1, with flux-conducting plates functioning as homogenization plates.

FIG. 2 shows an exemplary embodiment in which, in a modification of the exemplary embodiment in FIG. 1, additional homogenization plates 9 and 10 are positioned between the surfaces of the magnetic regions 4 and 5 and the sensor 6. In this exemplary embodiment, the homogenization plates 9 and 10 homogenize the field in the plane of the sensor 6, thus reducing the positioning precision of the sensor 6 in relation to the magnet pair and regions 4 and 5 required for offset-free operation.

With some intended uses of the above-described magnetoresistive XMR sensor elements 7 and 8, the sensor elements 7 and 8 require a constant premagnetization. As a result of this premagnetization, the sensor elements 7 and 8 are situated in a magnetic field in which the sensitivity is at a maximum. This so-called bias field is achieved with an exemplary embodiment to be inferred from FIGS. 3 and 4.

Figure 3:
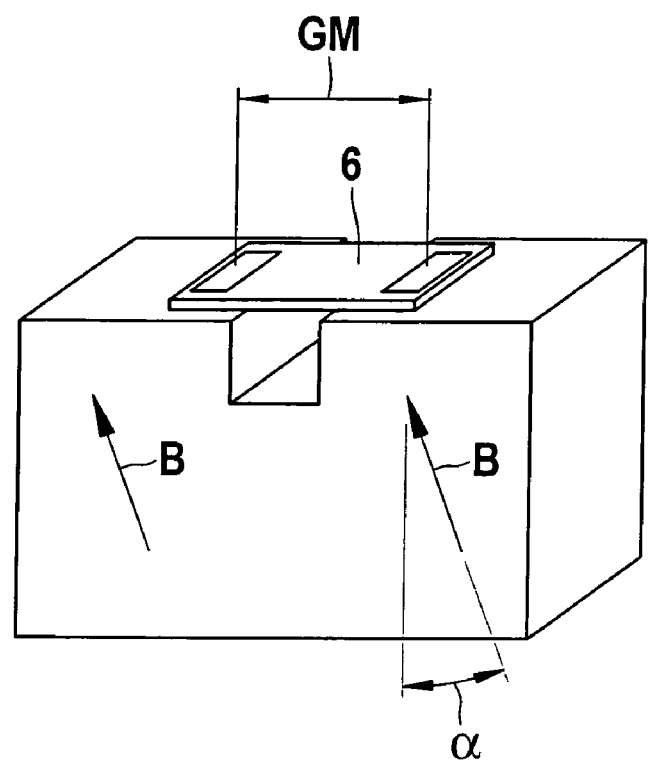
FIG. 3 shows an exemplary embodiment of a magnetic sensor arrangement having two individual magnets, which, by contrast with FIG. 1, have inclined magnetic fields.
Figure 4:
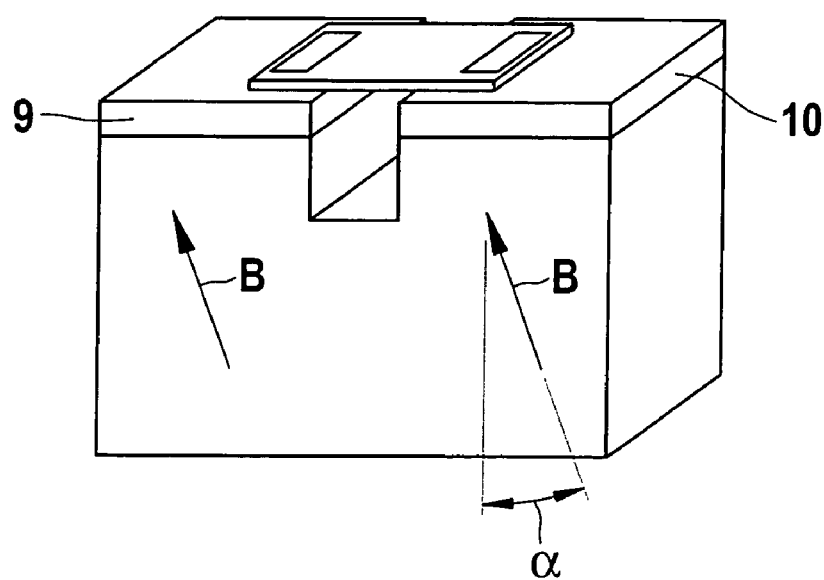
FIG. 4 shows an exemplary embodiment according to FIG. 3, having homogenization plates according to FIG. 2.

As shown in FIGS. 3 and 4, this bias field is produced through a rotation of the magnetization B in the regions 4 and 5 by the angle α. Here, too, as described above, two embodiment variants can once more be produced, one with an adjustment improvement through homogenization plates 9 and 10 (FIG. 4) and the other without the addition of these plates (FIG. 3).

Figure 5:
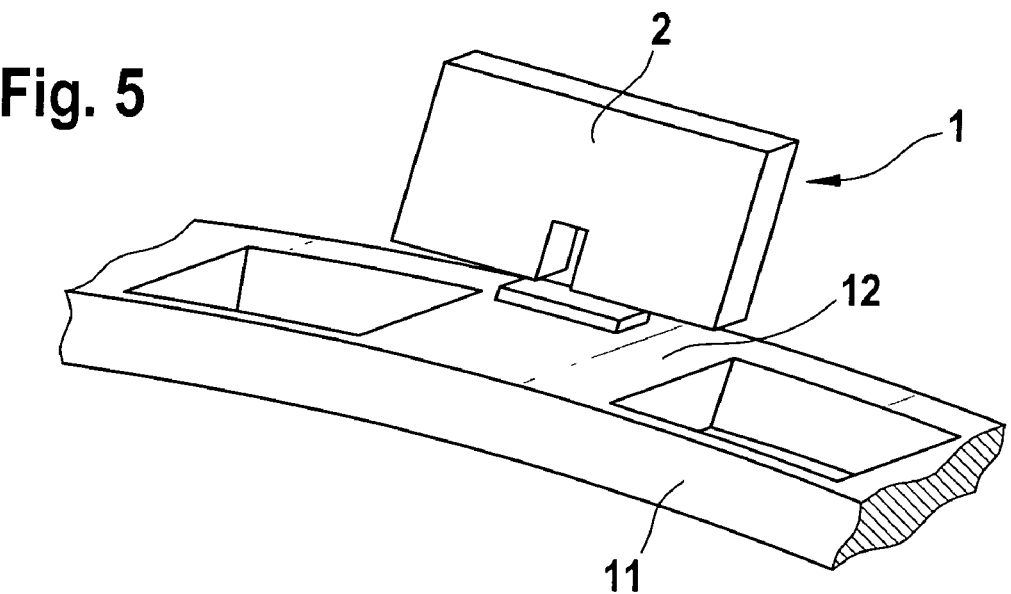
FIG. 5 shows a view of a magnetic sensor arrangement for a transmitter wheel provided with steel teeth.
Figure 6:
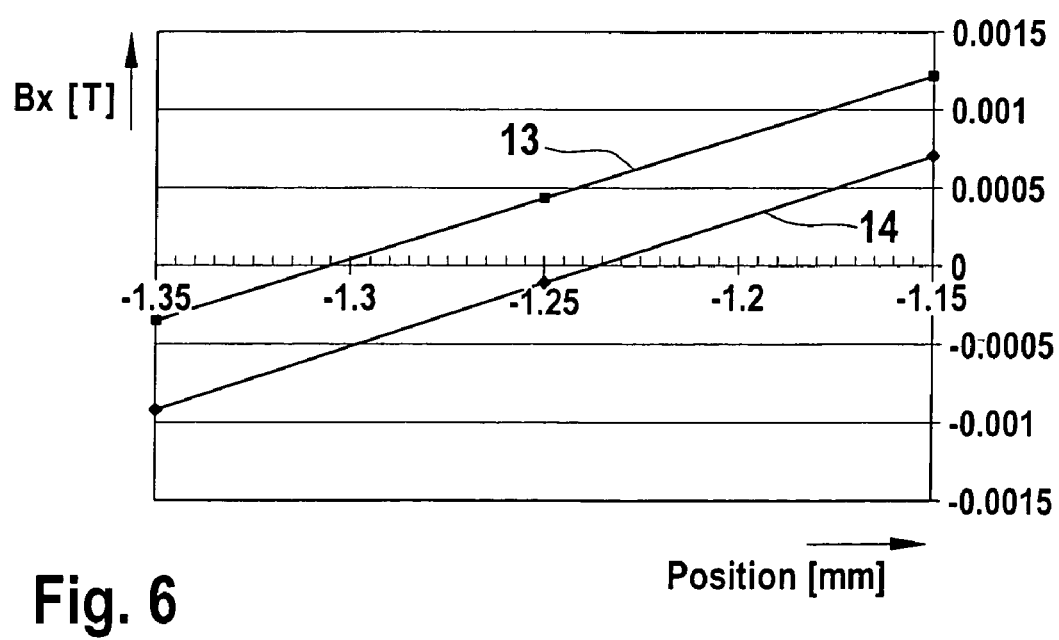
FIG. 6 is a graph depicting the curve of the magnetic field as a function of the position of a tooth or tooth gap of the transmitter wheel according to FIG. 5.

FIG. 5 shows a detail of a model in which the magnetic sensor arrangement 1 according to the present invention, for example the one shown in FIG. 1, is used in conjunction with a transmitter wheel 11, which is provided with teeth 12. By way of example, FIG. 6 shows a graph of a measurement result. In this case, the so-called "in-plane" component of the magnetic field Bx is plotted over the gradiometer position in relation to the center of the sensor 6, respectively for a tooth 12 (curve 13) and for a tooth gap (curve 14).

In a predetermined structural trial design with a gradiometer distance GM of 2.5 mm, it is clear from the graph that the curve of the magnetic field Bx at the sensor element position 1.25 mm for the two simulated positions of the transmitter wheel 11 (tooth 12, curve 13) and the tooth gap (curve 14) is symmetrical around the zero point, i.e. the signal of the respective sensor element 7, 8 is offset-free.

Figure 7:
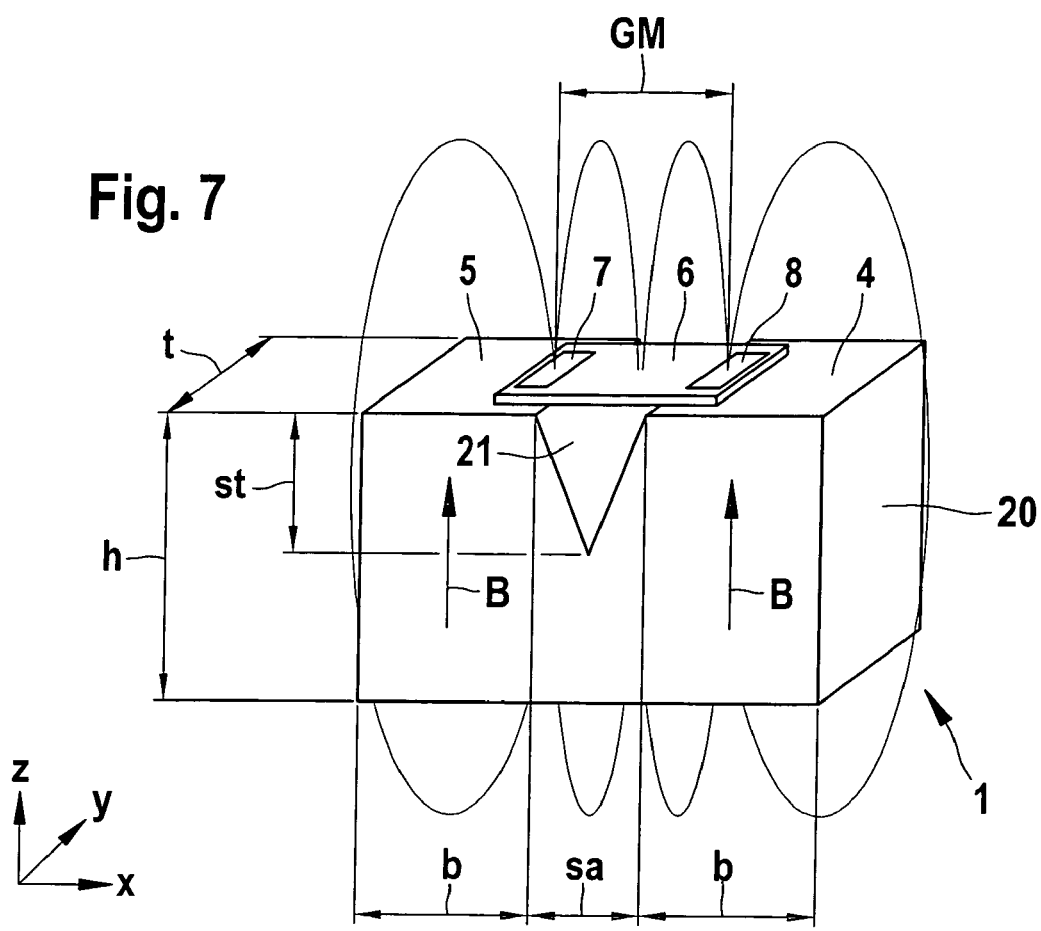
FIG. 7 is a schematic depiction of an exemplary embodiment of the magnetic sensor arrangement, having a permanent gap magnet, which, in a modification of the exemplary embodiments described above, has a wedge-shaped gap.

FIG. 7 shows an exemplary embodiment of a gap magnet 20, which has an wedge-shaped gap 21 and is particularly well-suited to achieving the advantages according to the present invention. In a manner comparable to FIG. 1, FIG. 7 depicts the gap magnet 20 and its position in relation to the sensor elements 7 and 8 in a gradiometer arrangement. In this instance, the optimal operating point is set by means of the special shaping and dimensioning of the wedge-shaped gap 21.

Figure 8:
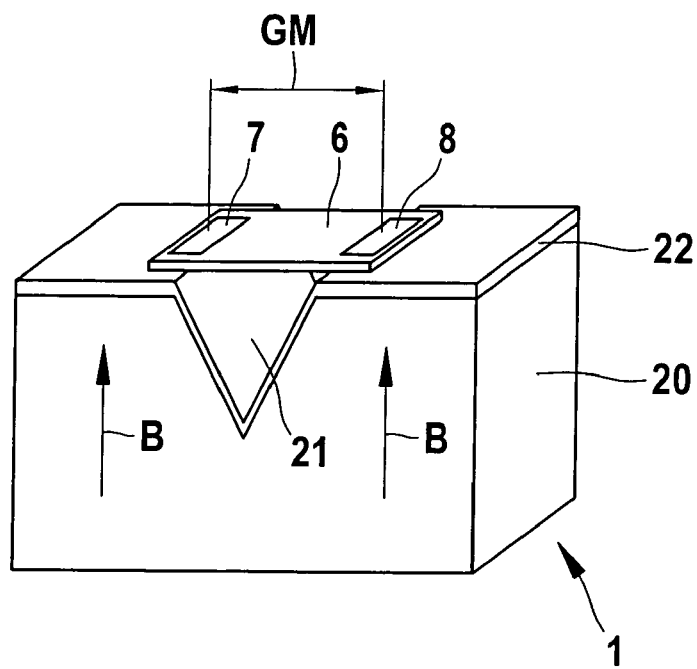
FIG. 8 shows an arrangement that has been expanded in relation to FIG. 7, with a flux-conducting plate.

In a modification in relation to FIG. 7, FIG. 8 shows a variant of the gap magnet 20, which is provided with a flux-conducting plate 22 that is adapted to the shape of the gap 21.

Figure 9:
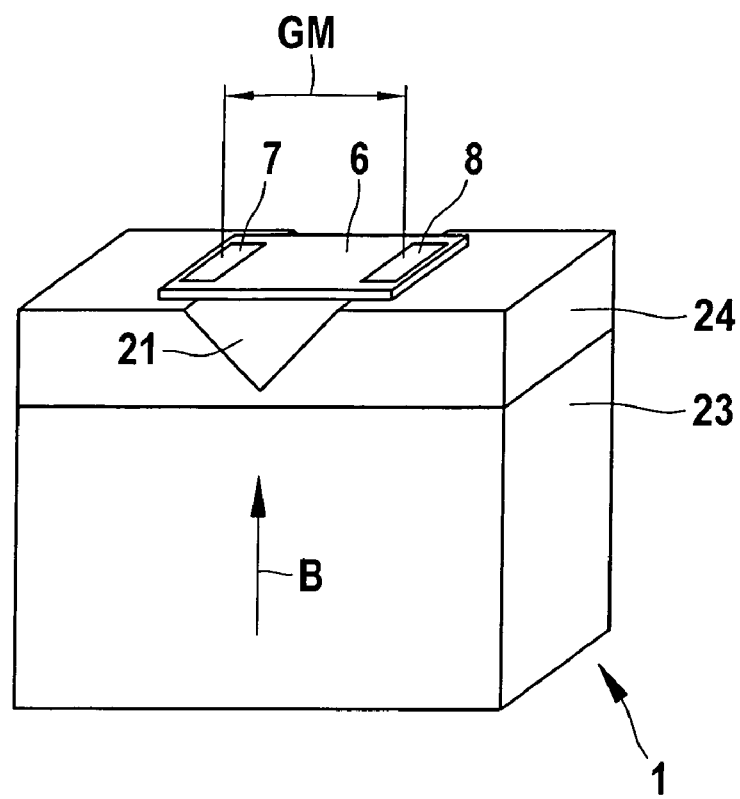
FIG. 9 shows an exemplary embodiment in which the wedge-shaped gap is situated in a compact flux-conducting plate.

FIG. 9 shows an exemplary embodiment of a magnet 23 in which, in lieu of a suitably shaped gap 21 being situated in the gap magnet, a specially shaped flux-conducting plate 24 is used, which is positioned against the surface of the rectangular magnet 23. The properties of the soft magnetic material of the flux-conducting plate 24 cause the field in the plane of the sensor elements 7 and 8 to be differently shaped than in a pure magnet; the x-component (see FIG. 7) of the magnetic field is minimized over large x-regions.

When using so-called XMR sensors, it can potentially be advantageous if the sensor elements 7 and 8 generate a constant premagnetization. As a result of this premagnetization, the sensor elements 7 and 8 are situated in a magnetic field in which the sensitivity is at a maximum. This can be achieved by means of a "bias field" according to FIG. 10 and also through a rotation of the magnetization B in the magnet 20 or 23, as shown in FIGS. 11 and 12.

Figure 10:
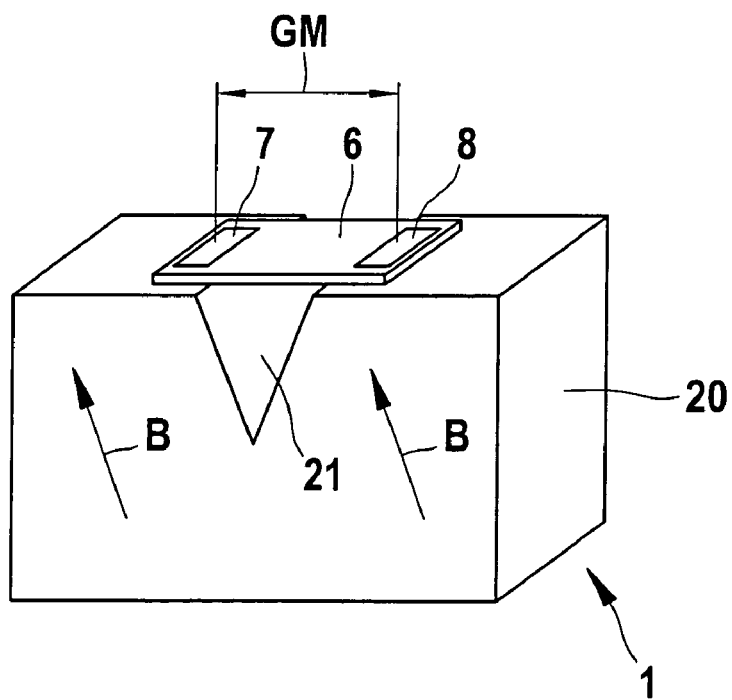
FIG. 10 shows an exemplary embodiment, which, in a modification of FIG. 7, has inclined magnetic fields.
Figure 11:
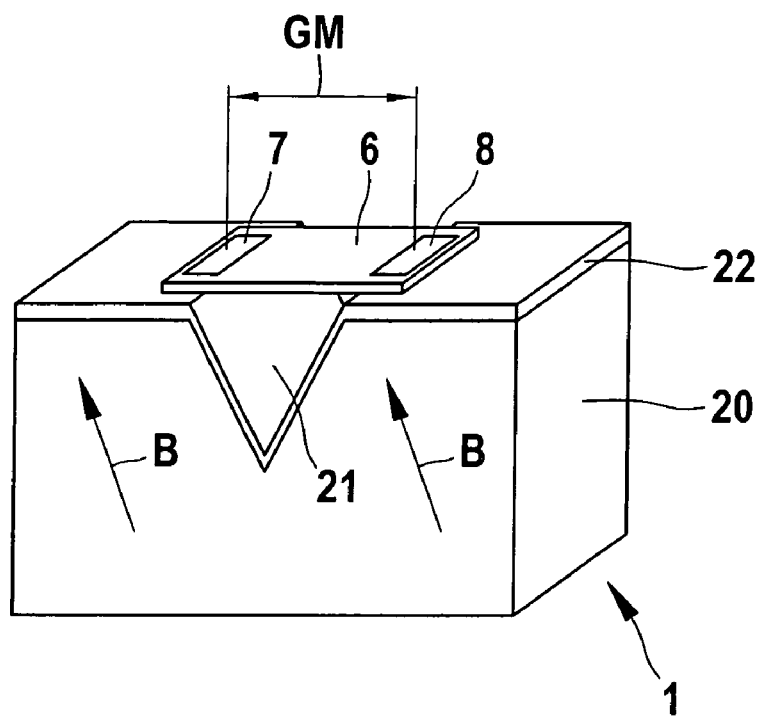
FIG. 11 shows an arrangement that has been expanded in relation to FIG. 10, with a flux-conducting plate.
Figure 12:
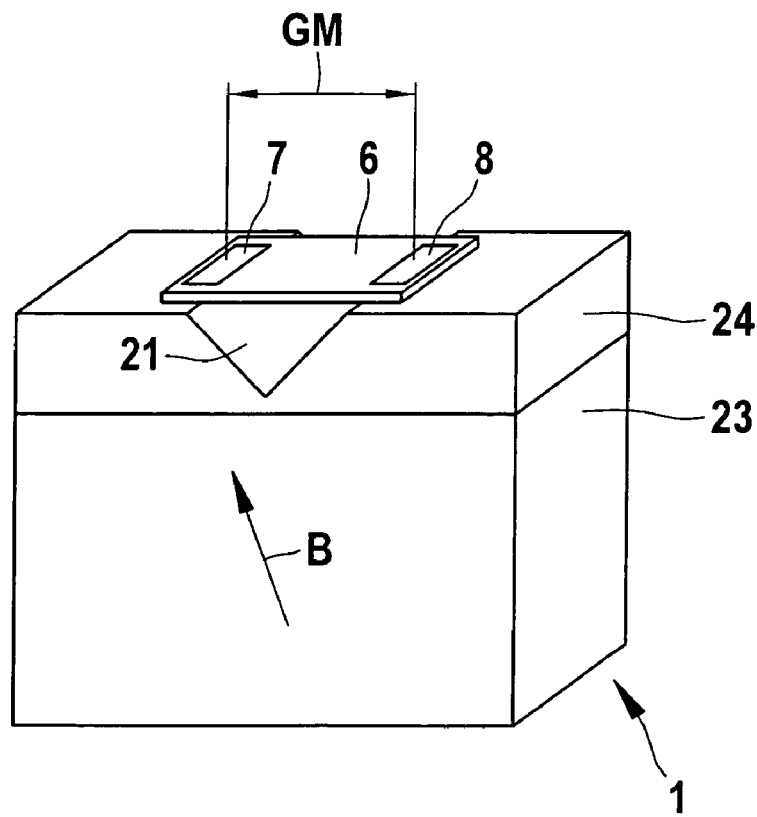
FIG. 12 shows an exemplary embodiment with an inclined magnetic field, in which the wedge-shaped gap is situated in a compact flux-conducting plate.

FIG. 10 shows an arrangement without a flux-conducting plate (see FIG. 7), FIG. 11 shows an arrangement with a flux-conducting plate 22 (see FIG. 8), and FIG. 12 shows an arrangement with a compact flux-conducting plate 24 that has a gap 21 (see FIG. 9) integrated into it.

Figure 13:
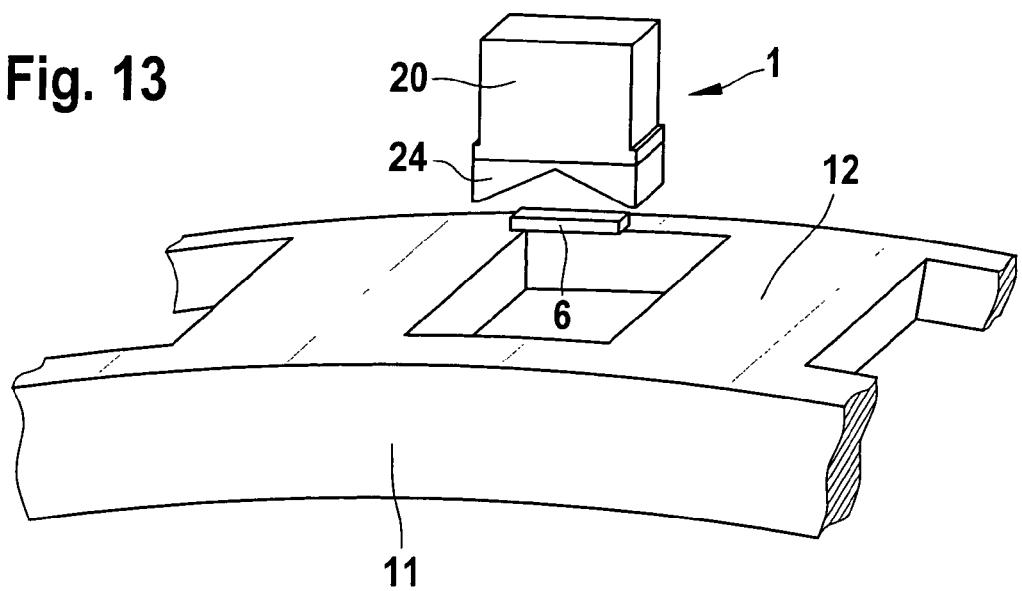
FIG. 13 shows a view of a magnetic sensor arrangement having a wedge-shaped gap for a transmitter wheel equipped with steel teeth.

FIG. 13 shows a detail comparable to the one shown in FIG. 5, of an arrangement that can be used to carry out magnetic field simulations for the purpose of designing the wedge shape of the gap 21 of the flux-conducting plate 24.

This arrangement can carry out magnetic field simulations for a fixed gradiometer distance—2.5 mm has been selected here as an example—and the size, material, and shape of the gap 21 can be determined so that the sensor operates with a high degree of sensitivity and a minimized offset and is consequently able to detect the weakest possible signals. When put into practice, this achieves large distances from a ferromagnetic transmitter.

As already mentioned at the beginning of the specification, the shape of the gap 21 is of great importance; in particular, geometries that diverge from the rectangular shape are advantageous. The gap 21 can be wedge-shaped, as shown in FIGS. 7 through 14, or be embodied in any curved design. The optimized shape of the gap 21 assures an offset reduction of the magnetic field B in the gradiometer direction, not only at the two positions of the sensor elements 7 and 8, but over a wide region, thus making it possible to significantly reduce the required positioning precision of the gradiometer in relation to the magnet 20.

Figure 14:
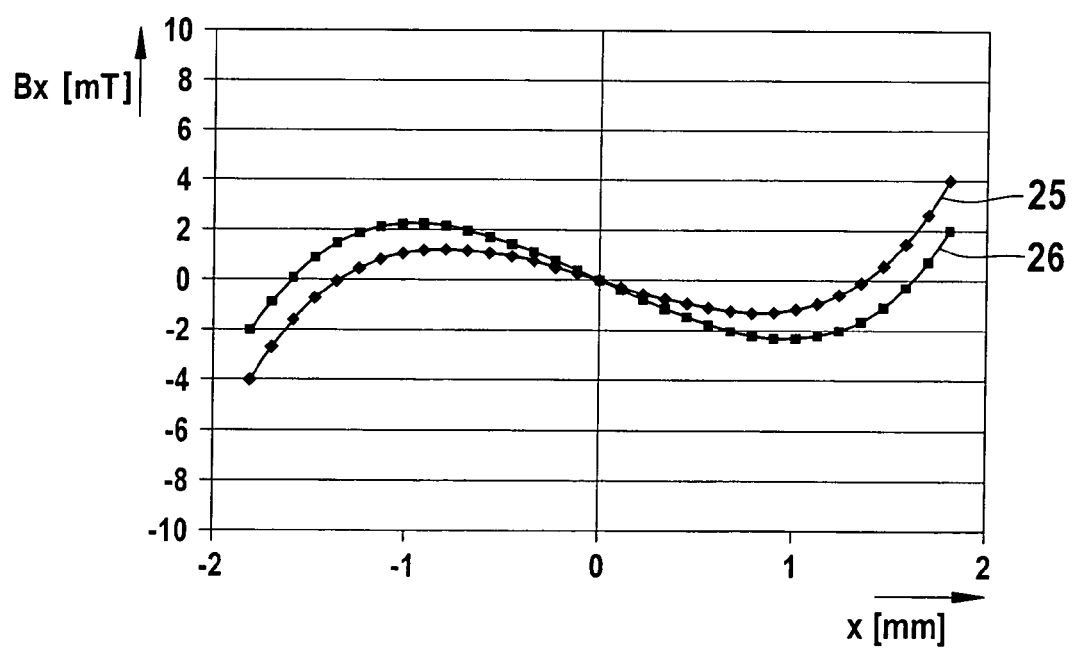
FIG. 14 is a graph depicting the curve of the magnetic field as a function of the position of a tooth or tooth gap of the transmitter wheel according to FIG. 13.

As an example, FIG. 14 in turn shows a simulation result. The x-component of the B field (Bx) is plotted here over the gradiometer position x in relation to the center of the sensor. It is clear from the graph that the amount of the offset of the magnetic field B is less than 1 mT over a large range. It is also clear that the curve of the magnetic field Bx for the two simulated positions of the transmitter wheel 11 (tooth 12, curve 25) and tooth gap (curve 26) is symmetrical around the zero position, i.e. the signal of the respective sensor element 7, 8 is offset-free. But the magnetic deviation, as a difference between the position of tooth and tooth gap, remains at an unchanged level.

What is claimed is:

1. A magnetic sensor arrangement, having
magnetically sensitive sensor elements (7, 8) whose electrical properties are changeable as a function of a magnetic field that a moving, passive transmitter element (11) is able to influence, with the magnetic field being substantially perpendicular to the sensor elements (7, 8), wherein
the magnetic sensor arrangement (1) has two sensor elements (7, 8) in a gradiometer arrangement that are each respectively associated with one of two regions (4, 5) of a permanent magnet embodied in the form of a gap magnet (2), which regions are spaced apart from each other by a predetermined distance (sa),
the sensor elements (7, 8) are arranged one after the other in a direction of movement of the transmitter element (11),
the sensor elements (7, 8) are associated with edges of a gap (21) in a rotary direction of the transmitter element,
the magnetic regions (4, 5) and the permanent gap magnet (2; 20) - in terms of the dimensions (h, b, t), the gap width (sa), the gap depth (st), and their positions in relation to the sensor elements (7, 8)—are situated so as to minimize the offset of the output signal of the sensor elements (7, 8) in the gradiometer arrangement, and
the gap (21) has a contour with a wedge-shaped narrowing in the direction of the gap depth (st) of the permanent gap magnet (20; 23).

2. The magnetic sensor arrangement as recited in claim 1, wherein
flux-conducting plates (9, 10) are positioned between the sensor elements (7, 8) and the magnetic regions (4, 5).

3. The magnetic sensor arrangement as recited in claim 2, wherein
each of the flux-conducting plates (24) is embodied in the form of a compact element into which the gap (21) is integrated.

4. The magnetic sensor arrangement as recited in claim 1, wherein
the magnetic sensor arrangement (1) is used to detect the rotation angle of a wheel (11) serving as the transmitter element, and the circumference of the wheel (11) is provided with teeth (12) in order to influence the magnetic field in the region of the magnetic sensor arrangement (1).

5. The magnetic sensor arrangement as recited in claim 4, wherein
the wheel (11) is embodied in the form of a steel wheel.

6. The magnetic sensor arrangement as recited in claim 1, wherein
the sensor elements (7, 8) are magnetoresistive XMR sensors.

* * * * *